(12) United States Patent
Knox et al.

(10) Patent No.: US 6,668,126 B2
(45) Date of Patent: Dec. 23, 2003

(54) TEMPERATURE STABILIZED OPTICAL FIBER PACKAGE

(75) Inventors: George J. Knox, Austin, TX (US); James F. Brennan, III, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 296 days.

(21) Appl. No.: 09/860,070

(22) Filed: May 17, 2001

(65) Prior Publication Data

US 2002/0191937 A1 Dec. 19, 2002

(51) Int. Cl.[7] .............................................. G02B 6/00
(52) U.S. Cl. ................... 385/135; 385/134; 385/136; 385/92; 385/123; 385/37; 398/147; 398/81
(58) Field of Search ........................... 385/14, 134, 37, 385/135, 136, 137, 123, 92, 88; 398/147, 81, 87

(56) References Cited

U.S. PATENT DOCUMENTS

| | | | | |
|---|---|---|---|---|
| 4,686,685 A | * | 8/1987 | Hoag | 372/107 |
| 4,702,599 A | | 10/1987 | Mohr | 356/350 |
| 5,050,184 A | * | 9/1991 | Nelson | 372/107 |
| 5,208,652 A | | 5/1993 | Sonobe et al. | 356/350 |
| 5,245,687 A | | 9/1993 | Usui | 385/134 |
| 5,416,585 A | | 5/1995 | Hadeler | 356/345 |
| 5,444,534 A | | 8/1995 | Dyott et al. | 356/350 |
| 5,486,922 A | | 1/1996 | Cordova | 356/350 |
| 5,763,885 A | * | 6/1998 | Murphy et al. | 250/352 |
| 5,887,107 A | | 3/1999 | Newman et al. | 385/137 |
| 5,896,199 A | | 4/1999 | Mark et al. | 356/350 |
| 6,060,319 A | * | 5/2000 | Deetz et al. | 436/8 |
| 6,118,914 A | | 9/2000 | Davis et al. | 385/37 |
| 6,226,438 B1 | | 5/2001 | Bylander et al. | 385/136 |

FOREIGN PATENT DOCUMENTS

| | | | | |
|---|---|---|---|---|
| EP | 0 795 766 A1 | 9/1997 | | 385/135 X |
| JP | 3-58006 | 3/1991 | | 385/135 X |
| JP | 8-313271 | 11/1996 | | 385/135 X |

OTHER PUBLICATIONS

Search Report for PCT/US01/21893.

* cited by examiner

Primary Examiner—Brian Healy
(74) Attorney, Agent, or Firm—Alan Ball; Gregg H. Rosenblatt

(57) ABSTRACT

A temperature stabilization package comprises a hollow external housing of a thermally insulating material. The hollow external housing includes a holder and a lid to cover the holder. The holder includes a floor having at least one projection and a separating wall around the projection. An internal surface of the lid has at least one post formed therein. The housing surrounds a container that includes a base and a cover over the base to form an internal cavity inside the container. An outer face of the base has at least one lower socket. The cover includes at least one upper collar so that the container may be coupled inside the hollow external housing by engagement of a lower socket with a projection and an upper collar with a post to hold the container substantially surrounded by, but spaced from, the wall and the hollow external housing. The internal cavity maintains a substantially uniform region of temperature therein, shielded from unstable thermal conditions outside the hollow external housing of the temperature stabilization package.

20 Claims, 2 Drawing Sheets

TEMPERATURE STABILIZED OPTICAL FIBER PACKAGE

FIELD OF THE INVENTION

The present invention relates to a temperature-stabilized package that improves the performance of a chromatic dispersion compensation Bragg grating by providing a substantially uniform temperature around a fiber optic coil including the Bragg grating.

BACKGROUND OF THE INVENTION

Telecommunication systems using optical fiber networks rely on a succession of short pulses of light to transmit coded information between widely separated locations. Light pulses include a range of wavelengths. It is well known that the velocity of light varies as a function of wavelength as the pulses of light move along an optical fiber. This phenomenon is known as chromatic dispersion. It occurs because longer wavelength light travels more slowly than those of shorter wavelength. As a pulse lengthens, it begins to interfere with the succeeding light pulse making it difficult to distinguish the end of one pulse from the beginning of the next. Typically, signals begin to merge as they travel through long optical fiber cables.

It is known to compensate chromatic dispersion using a Bragg grating to recompress the pulses to their original length. Light of shorter wavelength penetrates further into the grating than longer wavelengths, before reflection. The longer reflection path delays the shorter wavelengths to make them substantially coincident with the longer reflected wavelengths, and to compress all reflected wavelengths into the time interval of the originally transmitted pulse.

The reflection characteristics of a Bragg grating are known to change with temperature. It is preferable, therefore, to locate a dispersion compensating Bragg grating in a uniform temperature environment. The need for temperature uniformity in the vicinity of optical fiber coils has been addressed previously. U.S. Pat. No. 6,226,438, for example, describes a package for containment of an optical fiber that includes a Bragg grating. A housing, having a lower conductivity than a retaining member, provides containment of the optical fiber and the retaining member. The insulating material of the housing provides a primary defense against non-uniform heating of the package. Filler in the form of a gel provides improvement of thermal stability inside the housing. The need to maintain contact between substantially the entire length of the Bragg grating and a surface of the retaining member is a demanding requirement.

Other optical fiber devices subject to temperature-related output-drift include optical gyroscopes. Although different from fiber optic Bragg gratings, optical fiber gyroscopes operate best in a temperature-stabilized environment. For example, U.S. Pat. No. 4,702,599 describes a rotation-rate measuring instrument that uses an optical fiber coil. Fluctuations in ambient temperature induce measurement errors. Embedding the optical fiber in a conductive sealing compound and placing the sealed coil inside a housing constructed from a very good thermal conductor significantly reduces these errors. Thermal radiation striking the outer wall of the housing dissipates rapidly due to thermal conductivity of the housing. Redistribution of the heat provides a means for compensating temperature induced measurement errors. This reference teaches the need to place an optical fiber coil in intimate contact with a thermally conducting compound and thereafter enclose the sealed coil in contact with the inner wall of a double walled housing having an air gap between the walls. Heat bridges link walls of a relatively complex structure that comprises a material of high thermal conductivity.

A thermally stabilizing enclosure may include both thermally conducting and thermally insulating materials, as in U.S. Pat. No. 5,208,652. This describes an optical branching/coupling unit for an optical fiber gyroscope including a thermal buffer box that prevents the influence of temperature on gyroscope output. A heat transmitting case surrounds an optical fiber loop wound on a spool made from a material of high thermal conductivity. The heat transmitting case resides inside a heat insulating case contained inside a heat-transmitting casing that provides the outermost layer of the thermal buffer box. External changes in temperature are moderated during passage of heat through the alternating layers of heat conducting and heat insulating materials. As a result any temperature changes in the vicinity of the optical fiber coil are slight and uniform. The buffer box requires multiple alternating layers of thermally conducting and insulating materials.

Temperature compensation was attempted using only thermally insulating materials. In this case, U.S. Pat. No. 5,245,687 describes an optical fiber coil for a fiber optic gyro wound on a bobbin, contained in an annular case resting on a relatively massive support plate that is essentially a heat sink. The thermal conductivity of the bobbin and the case substantially equals that of the fiber coil. Both the coil and the case respond slowly to abrupt changes in ambient temperature to reduce drift in the output of a fiber optic gyro made from the coil. Such a construction teaches that the entire optical fiber coil is surrounded, essentially encapsulated, with a material of low thermal conductivity. Consequently, use of a low thermal conductivity bobbin suppresses the drift in the gyro output due to the influence of an ambient temperature change.

U.S. Pat. No. 5,416,585 describes a relatively complex approach for correcting fiber optic gyro drift rate error due to changes in temperature. Sensing of temperature differences between an optical fiber coil-carrying spool and a housing for the spool may be used to compensate drift rate error. Temperature differences, measured by sensors in the housing and/or the coil, provide input to associated electronic circuitry, connected to the sensors. The electronic circuit calculates the temperature difference between the gyro housing sensor and the coil spool sensor and produces and applies a correction factor to the output of the fiber optic gyro. The structure surrounding the coil in this case does not appear to provide a uniform temperature since any drift in gyro output, with time, requires detection and compensation by the external monitoring equipment that uses the electronic circuitry. Although not specified, there is indication that the housing is a metallic housing.

The previous discussion suggests the need for a relatively simple device for containment of optical fibers in a uniform temperature environment. Suitable devices should have few parts and be easy to assemble as packages that contain optical fibers, particularly fiber optic Bragg gratings, at a uniform temperature. This would allow a grating to operate, substantially without change, during exposure of a package to temperature gradients such as those present in enclosures that house power supplies and other heat generating components used for telecommunications networks.

SUMMARY OF THE INVENTION

The present invention satisfies the need for a simple, easily-assembled package that maintains a substantially uniform temperature inside a container for an optical fiber that preferably includes a long fiber optic Bragg grating. Construction of a container according to the present invention requires a material, such as copper or aluminum, having high thermal conductivity. Due to its long length the fiber optic Bragg grating may be coiled to fit inside the container. The package includes a housing coupled to the container of the fiber optic Bragg grating. While material selection is not necessarily limiting, preferably the housing according to the present invention comprises a material, such as a plastic resin, that is a poor conductor of heat. Use of the term coupled for attachment of the container to the housing indicates that intervening structures may exist between the two. Coupling means include those that minimize the temperature gradient across the high conductivity container, while placing the fiber optic Bragg grating in a region of substantially uniform temperature inside the container.

A preferred embodiment according to the present invention comprises a container coupled to the housing using a low area of contact between them. This reduces the amount of heat flowing from the housing to the container and influences the way in which regions of uniform temperature, referred to herein as isotherms, develop inside the container. Except at points of coupling, an air gap separates inner walls of the housing from the outer surface of the container. Minimal contact between housing and container provides additional thermal insulation.

Coupling of a container inside a housing preferably uses an interlocking hub structure, having mating parts formed integrally with either the outer surface of the container or the inner walls of the housing. To minimize heat transfer, the hub diameter may be essentially the minimum required to prevent separation or breakage of the coupling between the container and the housing. If one side of the housing is heated relative to the other, a temperature gradient will exist between opposite outer surfaces of the housing. Heat from outside the housing will reach the container primarily by way of the hub structure. Most heat will flow from a warmer hub towards the thermally conductive container, and radially outward from the warmer hub, through the rim of the container, then radially inward to a hub structure on the cooler side of the housing. This will create circular isotherms radiating outward from a hub and planar isotherms through the outer rim representing the thickness of the container. A fiber optic Bragg grating of a substantially flat optical fiber coil will lie in a uniform region of temperature corresponding to a circular isotherm, preferably close to the rim of the container. The temperature remains relatively constant along the Bragg grating whether or not a substantial portion of the grating actually touches the container.

An alternative embodiment according to the present invention dispenses with the hub structure. The inner walls of the housing may contact the outer surface of the container thereby losing the benefit of a thermally insulating air gap. Regions of uniform temperature in this embodiment have contours differing from the circular isotherms of the preferred embodiment previously described. In the absence of circular isotherms a circularly coiled optical fiber may not adopt a position corresponding to a uniform region of temperature, especially when there is a temperature gradient. Selection of conducting and relatively non-conducting material for the container and the housing produces a package that reduces the impact of thermal gradients, but the alternative embodiment is less effective for maintaining a uniform temperature over the length of the fiber optic Bragg grating. Additional layers of thermally conducting or insulating materials may be positioned outside the housing for further shielding against temperature gradients.

More particularly the present invention provides a temperature stabilization package comprising a hollow housing that includes at least one connecting element for coupling a container formed to include an internal cavity. The connecting element holds the container and the hollow housing in a substantially spaced-apart relationship. Also, the internal cavity has a substantially uniform region of temperature therein, protected from unstable thermal conditions outside the temperature stabilization package. The housing further includes a floor having a separating wall formed integrally therewith to retain the substantially spaced-apart relationship between the container and the housing.

In another embodiment, a temperature stabilization package according to the present invention includes a hollow external housing comprising a thermally insulating material and a container formed to include an internal cavity using a thermally conducting material. The container resides inside the hollow external housing, and the internal cavity maintains a substantially uniform region of temperature, shielded from unstable thermal conditions outside the hollow external housing of the temperature stabilization package.

A preferred temperature stabilization package comprises a hollow external housing comprising a material having low thermal conductivity. The hollow external housing includes a holder and a lid to cover the holder that includes a floor having at least one projection and a separating wall around the projection. Also, the lid includes an internal surface having at least one post formed therein. A container, included in the temperature stabilization package, has a base and a cover over the base to form an internal cavity of the container. The base has at least one lower socket on an outer face thereof, and the cover includes at least one upper collar. Coupling of the container inside the hollow external housing results from engaging the at least one lower socket with the at least one projection and the at least one upper collar with the at least one post. This holds the container substantially surrounded by, but spaced from, the separating wall and the hollow external housing. The internal cavity maintains a substantially uniform region of temperature therein, shielded from unstable thermal conditions outside the hollow external housing of the temperature stabilization package.

The present invention further provides a temperature stabilized chromatic dispersion compensation module comprising a hollow external housing comprising a thermally insulating material, and optionally including at least one connecting element. A container formed to include an internal cavity, using a thermally conducting material, fits inside the hollow external housing coupled to the at least one connecting element (when present). This holds the container and the hollow external housing in a substantially spaced-apart relationship. The internal cavity maintains a substantially uniform region of temperature therein, shielded from unstable thermal conditions outside the hollow external housing of the temperature stabilization package. A fiber optic coil having a Bragg grating therein positioned in the uniform region of temperature inside the internal cavity of the container provides chromatic dispersion compensation of light passing through the fiber optic coil.

The output of a fiber optic Bragg grating may be stabilized according to the present invention using a method that comprises the steps of initially providing a temperature stabilization package comprising a hollow housing including at least one connecting element, and a container including an internal cavity. Coupling of the container to the housing uses the at least one connecting element to hold the container and the hollow housing in a substantially spaced-apart relationship. The internal cavity has a substantially uniform region of temperature therein, protected from unstable thermal conditions outside the temperature stabilization package. Placing a fiber optic Bragg grating in the substantially uniform region of temperature stabilizes the grating against temperature-related output variation.

Definitions

The following definitions provide clarification of terms used herein.

A "housing" may be combined with the terms "hollow" or "external" or other similar adjectives to describe an enclosure formed from a thermally insulating material, i.e. having low thermal conductivity, by any of a number of known forming methods. Preferably the housing comprises a plastic resin formed by conventional molding techniques including thermoforming and injection molding.

A "container" as used herein is preferably thermally conductive and formed using a metal such as copper or aluminum or similar metals or metal alloys having a thermal conductivity of more than 100 W/m-K. Common metal forming methods such as casting, machining and stamping may be used to provide a container according to the present invention.

A "separating wall" refers to a structure inside a housing, preferably integrally formed therewith, to aid in maintaining a spaced-apart relationship between a container and housing of a temperature stabilized optical fiber package according to the present invention.

The term "access port" refers to a passage through a housing to allow terminal ends from a Bragg grating, residing in a cavity in a container, to extend from the housing for connection to optical components outside the housing. As an alternative, a fiber optic connector may be positioned in an access port to facilitate connection of the Bragg grating to other optical components.

A "connecting element" means any one of a variety of permanent or releasable connecting structures used to hold a container inside a housing to couple the two in a relatively fixed, preferably spaced-apart relationship. Suitable connecting elements include rivets, studs, projections, posts, sockets, collars, mechanical fasteners, and interference fasteners such as hook and loop fasteners and similar forms of releasable connectors.

The beneficial effects described above apply generally to the exemplary devices and mechanisms disclosed herein of the temperature stabilization packages for optical fibers. The specific structures through which these benefits are delivered will be described in detail hereinbelow.

BRIEF DESCRIPTION OF THE DRAWINGS

The invention will now be described in greater detail with reference to the attached drawings in which.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 1:
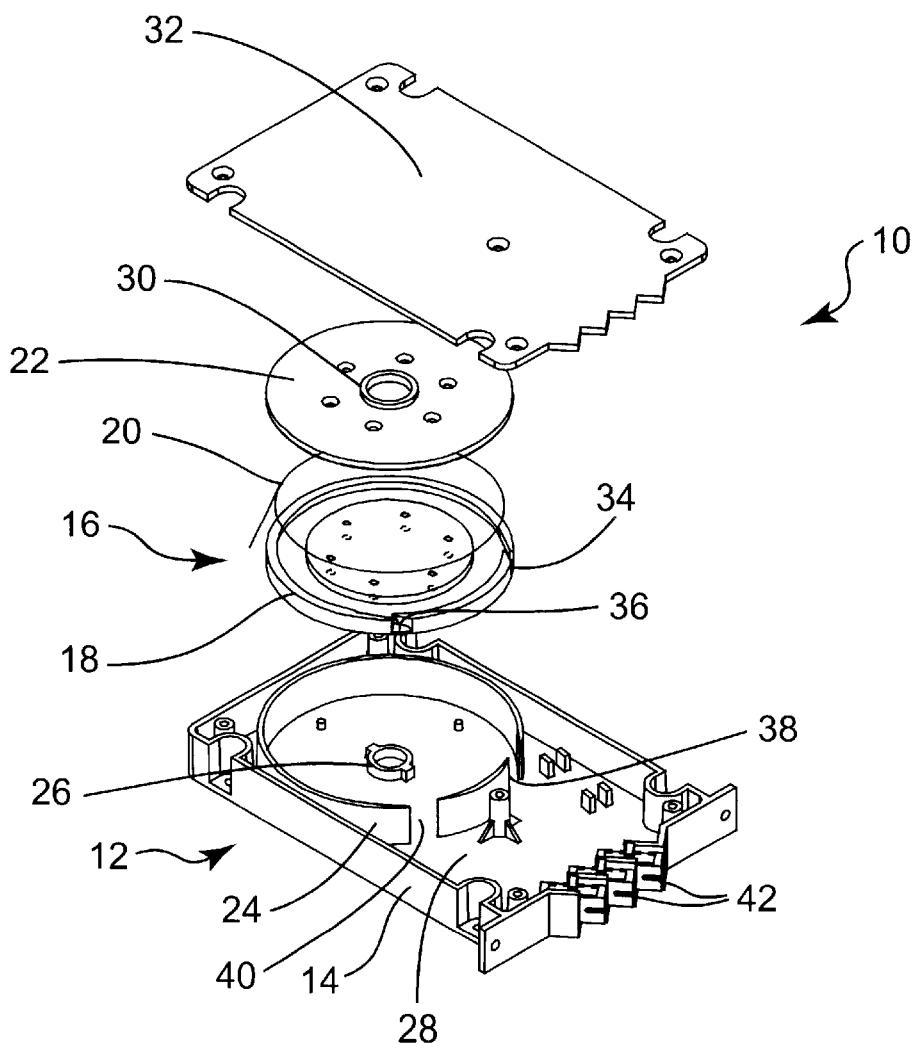
FIG. 1 is an exploded perspective view of a temperature stabilization package according to the present invention.
Figure 2:
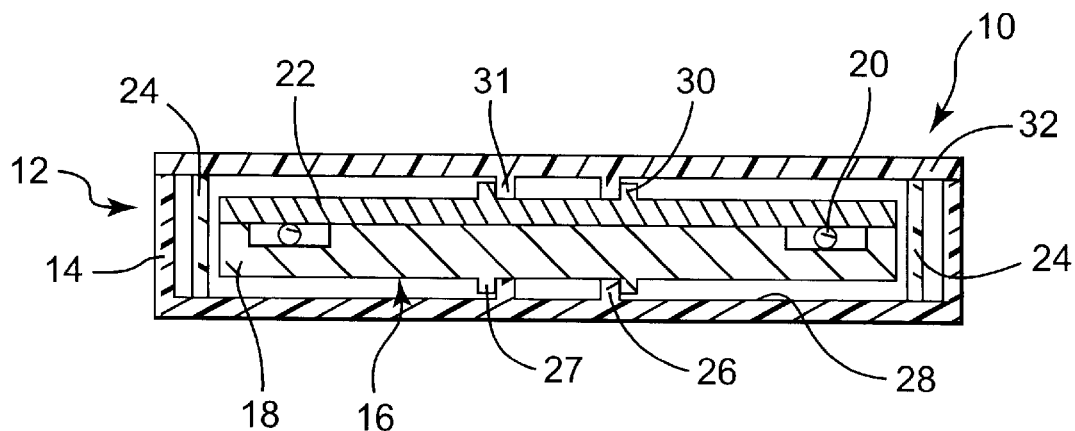
FIG. 2 shows a cross sectional view of a temperature stabilization package according to the present invention.

Referring now to the figures wherein like numbers represent like parts throughout the several views, FIG. 1 shows an exploded perspective view of a temperature stabilization package 10 for a fiber optic Bragg grating according to the present invention. FIG. 2 shows a cross section of the assembled package 10. The package 10 includes a housing 12 having a holder 14 for a container 16 that includes a base 18 in which an optical fiber 20 may be stored, usually in the form of a coil. After placement in the base 18 of the container 16, the optical fiber 20 may be encased in the container 16 by placing a cover 22 over the base 18.

The holder 14 includes a separating wall 24 shaped to substantially surround the container 16 leaving a space between the inner surface of the separating wall 24 and the perimeter of the container 16. A projection 26 protrudes from the floor 28 of the holder 14 for mating engagement with a lower collar 27 on the underside of the base 18 of the container 16. Engagement between the lower collar 27 and the projection 26 produces a lower hub coupling the container 16 to the holder 14. The cover 22 has a similar upper collar 30 for mating engagement with a post 31 on the underside of a lid 32 for the holder 14.

A fully assembled package 10, has an optical fiber 20 inside a container 16. The container 16 lies inside the separating wall 24 of the holder 14, covered by the lid 32 so that the projection 26 enters the lower collar or socket 27 to form a lower hub and the post 31 enters the upper collar 30 to form an upper hub. Although preferred hubs include releasable connecting elements, as described above, the use of rigid, permanent connecting elements, such as rivets or studs, also provides effective connection of a container 16 to a housing 12 according to the present invention. Reference to collars herein recognizes the provision of connecting elements including sockets. The upper and lower hubs retain the container 16 in a relatively fixed position inside the housing 12 and provide separation between the container 16 and the housing 12 so that an air gap exists between the planar surfaces inside the housing 12 and the outer surfaces of the container 16. This air gap plus spacing of the perimeter of the container 16 from the wall 24, as described previously, places the container 16 in a condition to benefit from the insulating effect of air except at points of suspension of the container 16 in the housing 12, represented by the upper hub and the lower hub. As well as connecting through the upper hub, the lid 32 of the housing 12 may have attachment to the holder 14 by convenient means including fasteners, hinges and the like.

A container 16 further includes a first opening 34 and a second opening 36 to allow free ends of an optical fiber coil 20 to emerge from the container 16. The wall 24 allows passage of fiber ends through a first break 38 and a second break 40. Connection of fiber ends to devices outside of the thermal equalization package 10 may require several access ports 42 for entry or exit of optical fiber ends and associated cables to and from the holder 14. The access ports may act as retainers for fiber and cable connectors to further facilitate connection of a fiber optic Bragg grating to external devices.

Thermal stabilization, using a package 10 according to the present invention, involves isolating an optical fiber coil 20 in an environment of substantially uniform temperature. The coil 20 includes an optical fiber Bragg grating that is susceptible to changing temperature that causes drift of the wavelength of pulses of light passing through the optical fiber 20. A uniform temperature may be achieved according to the present invention in at least two ways using a relatively simple two-part structure comprising a container 16 and a housing 12. Material selection for the container 16 and housing 12 provides one aspect of temperature stabilization using a temperature stabilization package 10. Preferably the material for the container 16 is a metal such as copper or aluminum that conducts heat rapidly to moderate temperature throughout a conducting body. Placed inside a housing 12 of relatively low thermal conductivity, the container 16 has only a relatively small amount of heat to moderate. Using a housing 12 having low thermal conductivity and a container 16 having high thermal conductivity a relatively high temperature environment outside the housing 12 has difficulty penetrating into the space inside the housing 12. Any heat passing into the housing 12 has to cross an air gap before reaching the outer surface of the metal container 16. The conductive container 16 disperses heat impinging on its outer surface to produce a substantially uniform thermal environment inside the container. Suitable low conducting materials for the housing 12 include thermally insulating, commercially available plastic resins such polystyrene/polypropylene blends or alloys available from The Dow Chemical Company, Midland, Mich. under the trade name QUESTRA™. Other suitable resins include CIBATOOL®, available from Ciba-Geigy Corporation, Greensboro, N.C. and VALOX 357, available from GE Plastics, Pittsfield, Mass. Using preferred materials, a metal container 16 will have a thermal conductivity of more than 100 W/m-K. For reference, thermal conductivity values for common metals include; iron=70 W/m-K, aluminum 210 W/m-K, copper= 400 W/m-K, and silver=410 W/m-K. A plastic housing 12 preferably has a thermal conductivity below 0.5 W/m-K.

A second aspect of temperature stabilization depends upon the geometry of the temperature stabilization package 10 and particularly the coupling of the container 16 to the housing 12. There are only two points of contact between the container 16 and the housing 12, namely the upper hub and the lower hub of a temperature stabilization package 10 according to present invention. Narrowing the cross section of each hub reduces the amount of heat passing directly from the housing 12 to the container 16. In addition, heat transmitted in this way tends to radiate in circular bands or isotherms from the location of a hub towards the perimeter of the container 16. Circular isotherms provide substantially uniform regions of temperature inside the container 16. Positioning an optical fiber coil 20 essentially coincident with a circular isotherm places the coil 20 and associated Bragg grating at a substantially uniform temperature to further preserve the operating characteristics of the grating. When the optical fiber coil 20 remains in a uniform temperature region, there is no need for contact between the length of the fiber optic Bragg grating and the conductive surface of the container 16 in which it resides.

Material selection and control of uniform temperature regions within a temperature stabilization package 10 according to the present invention ensures that the temperature of a Bragg grating formed in an optical fiber 20 stays substantially uniform regardless of the environment outside the package 10. The material of the housing 12 insulates its contents from non-uniform heating conditions outside of the housing 12. This means that only a relatively small amount of heat passes through the housing 12. Transmission of this heat to the interior of the container 16 requires that it pass through the hub structure towards the container 16 where it forms radiant bands of substantially uniform temperature. The effective operation of a dispersion correction Bragg grating relies upon temperature uniformity rather than the precise temperature of operation.

The readily assembled temperature stabilization package 10 maintains a substantially uniform internal thermal environment even in the presence of significant thermal gradients, as follows. A coiled fiber optic Bragg grating was placed in a plastic housing and the dispersion of the device was measured. After applying a 20° C. temperature gradient across the plastic housing the dispersion compensation measurement was repeated. The temperature gradient caused a variation in the device dispersion that would make the device unsuitable for many applications in telecommunications. This suggests that a plastic housing alone provides unsuitable protection against thermal gradients.

Figure 3:
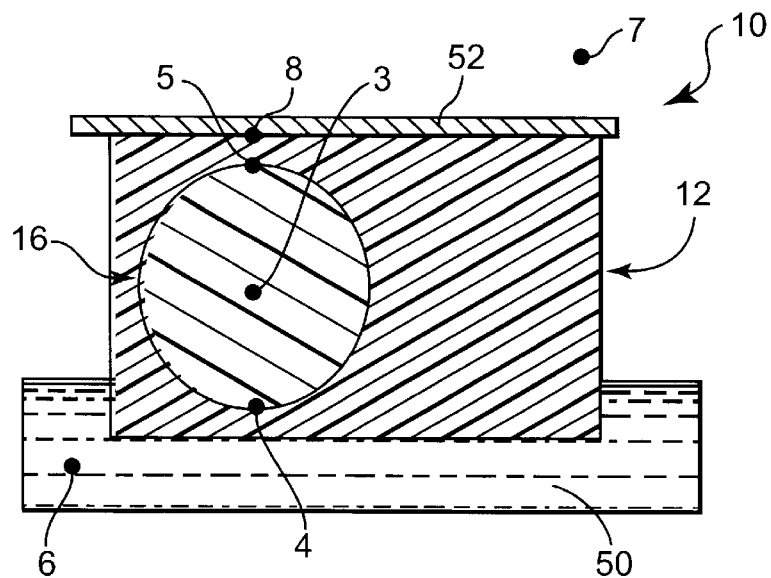
FIG. 3 provides a schematic cross sectional side view to show how a temperature stabilization package according to the present invention may be exposed to a thermal gradient.
Figure 4:
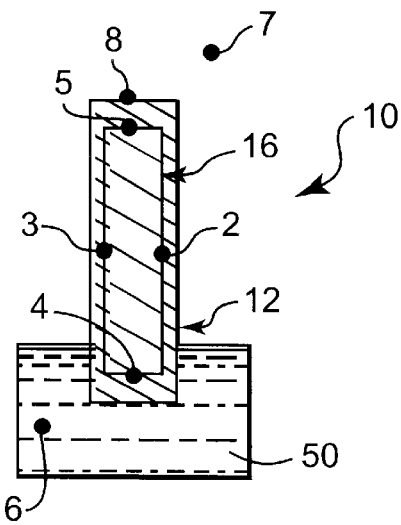
FIG. 4 is a schematic cross sectional end view showing how a package may be exposed to a thermal gradient.

Use of the same grating with alternate embodiments of a temperature stabilization package according to the present invention produced no evidence of error during exposure of the package to temperature gradients of 20° C. and 90° C. FIG. 3 and FIG. 4 show the orientation of the housing 12 and location of thermocouples used to measure temperatures inside the container 16 during exposure of a temperature stabilization package to a temperature gradient.

FIG. 3 provides a diagrammatic view of a temperature stabilization package 10 in a suitable orientation to apply a temperature gradient. Water in an ice bath 50 surrounds one side of the package 10 to a depth of about 0.75 inch. This cools part of the package 10 relative to ambient temperature or applied heat on the other side of the package 10. The warm side of the package 10 may be exposed either to ambient temperature or to a selected elevated temperature by the application of heat using a heating blanket 52. Thermocouples identified as black dots numbered 2 through 8 provide feedback of the temperature in various locations inside and outside of the temperature stabilization package. FIG. 4 provides further clarification of the positions of thermocouples.

FIG. 3 shows the relative positioning of the conductive container 16 inside the thermally insulating housing 12. A first embodiment of the temperature stabilization package 10 does not use hub coupling of the container 16 to the housing 12. The result is contact of the flat top and bottom of the shallow, hollow container 16 with planar surfaces inside the housing 12 and larger areas of contact for release of heat from the housing 12 to the container 16. This embodiment is somewhat less effective for temperature stabilization than the preferred embodiment that includes coupling by hubs as described above and indicated by FIG. 1 and FIG. 2.

The data of Table 1 indicate a lower overall temperature differential when a container 16 is coupled to a housing 12 using hubs. Reference to thermocouples 4 and 5 in Table 1 confirms that without hubs the container 16 has a 2° C. (11.8° C.–9.8° C.) spread of temperature adjacent to the warmest and coolest portions of the temperature gradient of 18.8° C. between air (19.3° C.) and ice (0.5° C.). When the temperature stabilization package 10 includes hub couplings the temperature spread between the same thermocouples is only 0.9° C. (13.2° C.–12.3° C.). Using a heating blanket 52 placed on top of the housing 12, the maximum temperature differential inside a hub-coupled container 16 was 3.8° C. (23.1° C.–19.3° C.). The temperature gradient was 89.3° C. from ice cooling at 0° C. on one side of the package 10 to the 89.3° C. of the heating blanket 52 on the other. An 89° C. temperature differential exceeds any anticipated temperature differential in any portion of current telecommunications networks. Reference to measured values from thermocouples 2–5 shows the relative uniformity of temperature inside a container 16. This is the temperature acquired by a Bragg grating-containing optical fiber 20 located inside the container 16. As stated previously the chromatic dispersion compensation performance of a Bragg grating depends more on uniformity of temperature than the particular temperature of operation.

Figure 5:
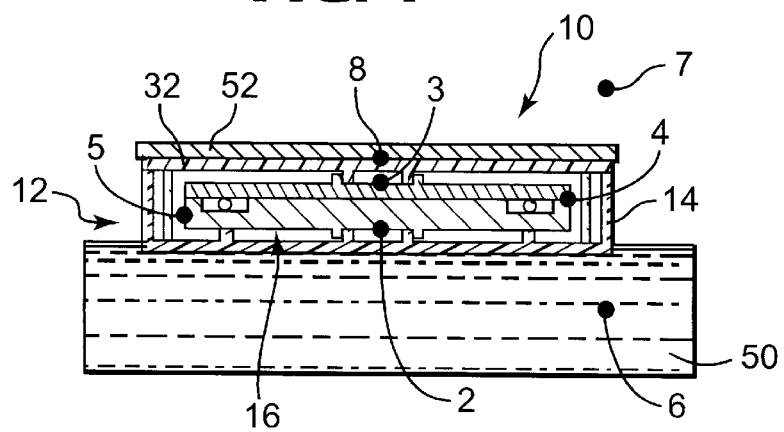
FIG. 5 provides a schematic cross section to show an alternative arrangement for applying a thermal gradient to a temperature stabilization package according to the present invention.

A second test of the temperature stabilization package 10 according to the present invention involves a change in orientation of the package 10 to that shown in FIG. 5. As illustrated, only the flat lower surface of the holder 14 of the housing 12 makes contact with the water in the ice-cooled water bath 50. The warm side of the package 10, corresponding to the outer surface of the lid 32, may be exposed either to ambient temperature or to a selected elevated temperature by the application of heat using a heating blanket 52. Thermocouples identified as black dots numbered 2 through 8 compare temperatures around the container 16 with upper and lower temperatures of the thermal gradient. Thermocouple measurements, shown in Table 2, provide test results based upon the preferred hub coupled thermal stabilizer 10.

TABLE 1

Thermocouple Readings
(Edge-to-edge temperature gradient)

| | | Thermocouple Readings | | |
|---|---|---|---|---|
| Thermocouple Identity | | Container | Hub-coupled Container | |
| Number | Position | 20° C. Gradient | 20° C. Gradient | 90° C. Gradient |
| 2 | Center cover | 11.4 | 13.2 | 20.4 |
| 3 | Center base | 11.4 | NA | 20.7 |
| 4 | Container first edge | 9.8 | 12.3 | 19.3 |
| 5 | Container other edge | 11.8 | 13.2 | 23.1 |
| 6 | Ice bath | 0.5 | 0.4 | 0 |
| 7 | Air | 19.3 | 18.3 | 19.7 |
| 8 | Housing | 16.8 | 17.9 | 89.3 |

TABLE 2

Temperature Distribution for a Hub-coupled Container
(Side to side temperature gradient)

| Thermocouple Identity | | Thermocouple Readings Hub-coupled Container | |
| --- | --- | --- | --- |
| Number | Position | 20° C. Gradient | 90° C. Gradient |
| 2 | Bottom hub | 6.5 | 39.9 |
| 3 | Top hub | 7.5 | 50.1 |
| 4 | Container edge | 7.7 | 49.1 |
| 5 | Opposite edge | 8.0 | 49.5 |
| 6 | Ice bath | 0.4 | 0.4 |
| 7 | Air | 20.3 | 19.7 |
| 8 | Lid | 12.5 | 93.4 |

Temperature stabilization reflected in the measurements shown in Table 1 and Table 2 maintains the output of a chromatic dispersion compensating Bragg grating with little effect on the delay error. Experiments exposing temperature stabilization packages 10 to temperature gradients outlined above demonstrate that such packages, according to the present invention, provide uniform regions of temperature around Bragg gratings to provide accurate chromatic dispersion compensation required for telecommunications networks.

A temperature stabilization package and its components have been described herein. These and other variations, which will be appreciated by those skilled in the art, are within the intended scope of this invention as described in the following claims.

What is claimed is:

1. A temperature stabilization package comprising:
   a hollow housing comprising a thermally insulating material, said hollow housing further including a separating wall; and
   a container formed to include an internal cavity, said container residing inside said separating wall of said hollow housing, said internal cavity having a substantially uniform region of temperature therein, shielded from unstable thermal conditions outside said temperature stabilization package.

2. The temperature stabilization package of claim 1, wherein said hollow housing is an external housing further including at least one connecting element to hold said container and said hollow housing in a substantially spaced-apart relationship.

3. The temperature stabilization package of claim 2, wherein said connecting element is selected from the group consisting of rivets, studs, projections, posts, sockets, collars, mechanical fasteners, and interference fasteners such as hook and loop fasteners and similar forms of connectors.

4. The temperature stabilization package of claim 1, wherein said hollow housing further includes a separating wall.

5. The temperature stabilization package of claim 4, wherein said container lies inside said separating wall.

6. The temperature stabilization package of claim 1, wherein said thermally insulating material is a plastic resin.

7. The temperature stabilization package of claim 6, wherein said plastic resin has a thermal conductivity of less than 0.5 W/m-K.

8. The temperature stabilization package of claim 1, wherein said hollow housing has a shallow rectangular shape including a peripheral wall having access ports.

9. The temperature stabilization package of claim 1, wherein said container comprises a thermally conducting material.

10. The temperature stabilization package of claim 9, wherein said thermally conducting material has a thermal conductivity greater than 100 W/m-K.

11. The temperature stabilization package of claim 10, wherein said thermally conducting material is selected from the group consisting of metals and metal alloys and the like.

12. The temperature stabilization package of claim 11, wherein said thermally conducting material is selected from the group consisting of copper, aluminum, magnesium, brass and steel.

13. The temperature stabilization package of claim 1, wherein said container has the form of a shallow cylinder.

14. A temperature stabilization package comprising:
    a hollow external housing comprising a material having low thermal conductivity, said hollow external housing including a holder and a lid to cover said holder that includes a floor having at least one projection and a separating wall around said projection, said lid including an internal surface having at least one post formed therein; and
    a container including a base and a cover over said base to form an internal cavity of said container, said base having at least one lower socket on an outer face thereof, said cover including at least one upper collar, said container coupled inside said hollow external housing by engagement of said at least one lower socket with said at least one projection and said at least one upper collar with said at least one post to hold said container substantially surrounded by, but spaced from, said separating wall and said hollow external housing, said internal cavity maintaining a substantially uniform region of temperature therein, shielded from unstable thermal conditions outside said hollow external housing of said temperature stabilization package.

15. A temperature stabilized chromatic dispersion compensation module comprising:
    a temperature stabilization package comprising:
      a hollow housing; and
      a container formed to include an internal cavity, said container residing inside said hollow housing, said internal cavity having a substantially uniform region of temperature therein, shielded from unstable thermal conditions outside said temperature stabilization package; and
    a fiber optic coil having a Bragg grating therein positioned in said substantially uniform region of temperature of said container.

16. The temperature stabilized chromatic dispersion compensation module of claim 15, wherein said hollow housing is an external housing including at least one connecting element to hold said container and said hollow housing in a substantially spaced-apart relationship.

17. The temperature stabilized chromatic dispersion compensation module of claim 15 wherein said hollow housing further includes a separating wall.

18. The temperature stabilized chromatic dispersion compensation module of claim 15, wherein said hollow housing comprises a thermally insulating material.

19. The temperature stabilized chromatic dispersion compensation module of claim 15, wherein said container comprises a thermally conducting material.

20. A method for stabilizing the output of a fiber optic Bragg grating comprising the steps of:

providing a temperature stabilization package comprising:

a hollow housing including at least one connecting element; and a container formed to include an internal cavity, said container coupled to said at least one connecting element to hold said container and said hollow housing in a substantially spaced-apart relationship, said internal cavity having a substantially uniform region of temperature therein, unaffected by unstable thermal conditions outside said temperature stabilization package; and placing a fiber optic Bragg grating in said substantially uniform region of temperature.

* * * * *

UNITED STATES PATENT AND TRADEMARK OFFICE
CERTIFICATE OF CORRECTION

PATENT NO. : 6,668,126 B2
DATED : December 23, 2003
INVENTOR(S) : Knox, George J.

It is certified that error appears in the above-identified patent and that said Letters Patent is hereby corrected as shown below:

<u>Column 8,</u>
Line 22, after "aluminum" insert -- = --.

<u>Column 11,</u>
Delete lines 57-61, corresponding to claims 4 and 5.

Signed and Sealed this

Seventeenth Day of August, 2004

JON W. DUDAS
*Acting Director of the United States Patent and Trademark Office*